United States Patent [19]

Maul et al.

[11] 4,377,416

[45] Mar. 22, 1983

[54] MASONRY CEMENT COMPOSITION, MASONRY CONSTRUCTION AND METHOD

[75] Inventors: Peter L. Maul, Addison, Ill.; Albert E. Robertson, Jackson, Miss.

[73] Assignees: American Colloid Co., Skokie, Ill.; United Cement Co., Jackson, Miss.

[21] Appl. No.: 325,689

[22] Filed: Nov. 30, 1981

[51] Int. Cl.$^3$ ............................................... C04B 7/02
[52] U.S. Cl. .................................................... 106/98
[58] Field of Search .............................. 106/93, 97, 98

[56] References Cited

U.S. PATENT DOCUMENTS 2,254,252  9/1941  Wertz ..................................... 106/98
2,313,107  3/1943  Wertz ..................................... 106/98

*Primary Examiner*—James Poer
*Attorney, Agent, or Firm*—Mason, Kolehmainen, Rathburn & Wyss

[57] ABSTRACT

A masonry cement is prepared by dry mixing portland cement, diatomaceous earth and a water-swellable colloidal clay, such as bentonite. Accordingly, the crushed limestone and other ingredients previously included in masonry cements for admixture with portland cement can be completely eliminated and substituted by diatomacious earth and water-swellable colloidal clay. In this manner, a combination of less than about 10% by weight of a combination of diatomaceous earth and colloidal clay replaces approximately 50% by weight crushed limestone and other ingredients from prior art masonry cement compositions while providing a masonry cement which meets ASTM specifications, particularly for air entrainment, water retention and compressive strength.

18 Claims, No Drawings

MASONRY CEMENT COMPOSITION, MASONRY CONSTRUCTION AND METHOD

BACKGROUND OF THE INVENTION

In accordance with ASTM definitions, masonry cement is defined as a hydraulic cement for use in mortars for masonry construction, containing one or more of the following materials: portland cement, portland blast-furnace slag cement, portland-pozzolan cement, natural cement, slag cement, or hydraulic lime; and in addition usually containing one or more materials such as hydrated lime, limestone, chalk, calcareous shell, talc, slag, or clay, as prepared for this purpose. The present physical requirements for mortars to meet ASTM specifications are as follows:

| | |
|---|---|
| Fineness, residue on a 45-μm (No. 325) sieve, max, % | 24 |
| Autoclave expansion, max, % | 1.0 |
| Time of setting, Gillmore method: | |
| Initial set, min, h | 2 |
| Final set, max, h | 24 |
| Compressive strength (average of 3 cubes): The compressive strength of mortar cubes, composed of 1 parts cement and 3 parts blended sand (half graded standard sand, and half standard 20-30 sand) by by volume, prepared and tested in accordance with this specification shall by equal to or higher than the values specified for the ages indicated below: | |
| 7 days, psi | 500 |
| (MPa) | (3.45) |
| 28 days, psi | 900 |
| (MPa) | (6.21) |
| Air content of mortar, prepared and tested in accordance with requirements of this specification: | |
| Min. volume % | 12 |
| Max, volume % | 22 |
| Water retention, flow after suction, min, % or original flow | 70 |

To achieve these test results, mortars are prepared from the masonry cement of the present invention by proportioning the masonry cement to contain the weight of cement, in grams, equal to six times the printed bag weight in pounds (13.228 times the printed bag weight in kilograms) and 1440 g of sand as outlined in ASTM C-91. The sand shall consist of 720 g of graded standard sand and 720 g of 20-30 standard sand also as outlined in ASTM C-91. The quantity of water, measured in milliliters shall be such as to produce a flow of 110±5 as determined by the ASTM flow table.

A typical prior art masonry cement contains approximately 50% portland cement, 42% high grade limestone and approximately 8% of other components, including an air entraining agent. Typically, masonry cements are manufactured by using a steel ball grinder to grind the limestone with the other components for admixture with the portland cement. These prior art masonry cements require a relatively high percentage i.e. 42% of limestone as a plasticizer to meet ASTM specifications for masonry cements. ASTM specifications for air content in a masonry cement are in the range of 12-22% by volume to provide void spaces in the masonry cement for durability since masonry cements require voids for expansion of freezing moisture.

The use of a substantial quantity of limestone as a plasticizer in prior art masonry cements creates two significant problems. First, the substantial quantities of limestone necessary to provide sufficient plasticity to the masonry cement reduces the compressive strength of the cement. Second, the limestone must be crushed in a grinder together with other components, such as a polyglycol, fatty acids, and a sucrose solution, to provide a slurry for admixture with the portland cement. The grinder must be carefully cleaned after each batch so that the masonry cement can be manufactured as a consistent, precise composition. Further, if the masonry cement composition is to be changed between batches, the grinder must be completely cleaned after each batch to make sure that the masonry cement being manufactured meets the ASTM specification for the particular type of masonry cement since it may be prohibitive for a particular type of masonry cement to include a component of the masonry cement previously included in the last limestone grinding batch.

PRIOR ART

Others have used diatomite, diatomaceous earth, bentonite or hydrous silicates of alumina as a thickening agent in a concrete or mortar generally in an amount of about 2% by weight or less of the cement composition, as disclosed particularly in the Cross U.S. Pat. Nos. 1,854,180 and 1,943,584 and, additionally as disclosed in the following U.S. patents:

U.S. Pat. No. 1,584,579
U.S. Pat. No. 1,795,011
U.S. Pat. No. 1,885,731
U.S. Pat. No. 1,920,358
U.S. Pat. No. 2,356,214
U.S. Pat. No. 2,377,491
U.S. Pat. No. 2,516,342
U.S. Pat. No. 2,529,841
U.S. Pat. No. 2,585,366
U.S. Pat. No. 3,219,112

Bentonite and diatomaceous earth when added to Portland cement alone, as disclosed in the Cross U.S. Pat. Nos. 1,854,180 and 1,943,584, are not sufficient to provide the necessary water retention and air entrainment properties to make the cement useful as a masonry cement. Mortars prepared with Portland cement containing 2% and 4% by weight bentonite and mortars prepared with portland cement containing 2% and 4% by weight diatomaceous earth were found to have the following values for water retention and air content, insufficient to meet ASTM specifications.

| | Portland plus 2% bentonite | Portland plus 4% bentonite | Portland plus 2% diatomaceous earth | Portland plus 4% diatomaceous earth |
|---|---|---|---|---|
| Water Retention (min. 70%) | 52 | 54 | 48 | 50 |
| Air Content (Min. 12%) | 11.9 | 10.7 | 7.4 | 6.8 |

Further, the Weber U.S. Pat. No. 2,643,193 discloses an insulating filler composition useful as an aggregate in place of sand for mixture with hardwall plaster or cement adapted for mixture with portland cement and containing both diatomaceous earth and colloidal clay. The maximum clay content, however, is less than 4% by weight and the composition is not adapted to be used as a masonry cement since the composition does not meet ASTM specifications.

SUMMARY OF THE INVENTION

In accordance with the present invention, it has been found that the crushed limestone and other ingredients previously included in masonry cements for admixture with portland cement can be completely eliminated and substituted by diatomaceous earth and one or more water swellable colloidal clays, such as bentonite. Accordingly, the masonry cement of the present invention includes portland cement, diatomaceous earth and water swellable colloidal clay. In this manner, a combination of less than about 10% by weight of a combination of diatomaceous earth and colloidal clay, such as bentonite, replaces approximately 50% by weight crushed limestone and other ingredients from prior art masonry cement compositions while providing a masonry cement which meets ASTM specifications for air entrainment, water retention and compressive strength.

DETAILED DESCRIPTION OF THE INVENTION

One of the ASTM requirements for masonry cements is that the masonry cement develop an initial set in a minimum of two hours. Because of this initial set requirement, all mortars being used today begin to stiffen within a period of 15 to 25 minutes requiring the mortar to be "shaken" or retempered every 15 to 25 minutes, depending upon temperature and humidity conditions. The mortar is re-tempered by adding water to the mortar on the mortar board and stirring to homogeneously mix the water into the mortar so that the mortar again is a proper consistency and has a useable flow.

In accordance with an important and surprising feature of the present invention, the mortar composition of the present invention can be used without re-tempering for two to three times longer than prior art masonry cements. Although the need for re-tempering is substantially reduced, mortar of the present invention will develop its initial and final set within the time limits of current ASTM specifications.

In accordance with another important, new and unexpected feature of the present invention, a 50 pound bag of the masonry cement composition of the present invention can be mixed with the same quantity of mason's sand meeting ASTM specification C-144, as a 70 pound bag of a typical prior art masonry cement containing approximately 45% high grade limestone and approximately 8% of other components, as previously described. It is very desirable for a mason or a mortar tender to be able to pour 50 pound bags instead of 70 pound bags to obtain substantially the same quantity of masonry cement, particularly where the masonry cement of the present invention does not require re-tempering for at least one hour.

A typical prior art bag of masonry cement weighs 70 pounds and includes approximately 35 pounds of portland cement, approximately 29 pounds of high grade crushed limestone, 1.5 pounds of a polyglycol, 1.5 pounds of fatty acids, 1.5 pounds of an air entraining agent and 1.5 pounds of a sucrose solution. A typical masonry cement of the present invention weighs 50 pounds and contains about 45.5 pounds of portland cement, type I, 0.25 pounds of diatomaceous earth and 4.25 pounds of bentonite.

The colloidal clay utilized in the present invention is one which will hydrate in the presence of water, i.e., will swell in the presence of water. In accordance with one important embodiment of the present invention, the colloidal clay is bentonite. A preferred bentonite is sodium bentonite which is basically a hydratable montmorillonite clay of the type generally found in the Black Hills region of South Dakota and in Wyoming. This clay has sodium as its predominant exchange ion. However, the bentonite utilized in accordance with this embodiment of the present invention may also contain other cations such as magnesium and iron. The replaceable or exchangeable cations may either be sodium or calcium. There are cases wherein a montmorillonite predominant in calcium ions can be converted to a high swelling sodium variety through a well-known process called "peptizing". The colloidal clay utilized in this invention may be one or more peptized bentonites. The colloidal clay utilized in accordance with the present invention may be any member of the dioctahedral or trioctahedral smectite group or mixtures thereof. Examples are Beidellite, Nontronite, Hectorite and Saponite. The colloidal clay, i.e., bentonite, generally is finely divided as known for use in water barrier panels and the like. Although any water hydratable colloidal clay can be used in this invention, it is preferred to mix two or more bentonties having different but complementary properties. It is known that mined bentonites, while all having generally the same chemical formula, can include various adsorbed surface ions or intermolecular ionic impurities which cause bentonties to have slightly different properties. For example, some bentonites have better tolerance to calcium ions than other bentonties while some bentonites have better plasticity or better polymer response. Accordingly, two or more bentonites, for example one bentonite known for its good plasticity, and one known for its calcium tolerance can be blended together before addition to the Portland cement component to achieve a mortar having excellent plasticity and calcium tolerance. In addition to providing for consistent mortar plasticizing performance, blending of bentonites having different properties improves properties such as resistance to calcium ion contamination and stability in the presence of low pH. Such properties are desirable in a masonry cement, since the Portland cement component can produce a high calcium environment, increasing the potential for exchange of sodium ions for calcium ions, the exchange affecting the hydration properties of the bentonite and consequently plasticity of the masonry cement. Hydration stability in the presence of lower than normal pH is very desirable since the water used in preparing masonry cement mortars is often brackish and of lower than normal pH.

The diatomaceous earth component used in accordance with the present invention can be of any type generally available. The diatomaceous earth should be ground to provide a relatively small particle size to increase the surface area. To achieve the full advantage of the present invention the dry particle size of the diatomaceous earth should be reduced to the extent that the surface area, as determined by BET Nitrogen adsorption, is at least 20 square meters per gram. It is preferred that the diatomaceous earth have surface area of at least 40 square meters per gram. As an example of a particular diatomaceous earth used in the masonry cement of the present invention, the diatomaceous earth has a surface area of 60 square meters per gram corresponding to the following gradiations:

| Size Of The Particles | Maximum % |
| --- | --- |
| Greater than 20 microns | 20% |
| 10 to 20 microns | 20% |
| 1 to 10 microns | 20% |
| Less than 1 micron | 40% |

In accordance with an important feature of the present invention, the masonry cement of the present invention includes portland cement combined with 0.05% to 0.8% by weight diatomaceous earth and 5% to 16% by weight water hydratable colloidal clay. The portland cement, therefore, is generally included in the composition of the present invention in an amount in the range of about 83.2% to about 95% by weight. The amount of portland cement can be reduced to as low as about 75% by weight to accommodate inclusion of other components such as portland blast-furnace slag cement, portland-pozzolan cement, natural cement, slag cement, hydraulic lime, limestone, chalk, calcareous shell, talc, slag, clay and/or additional water soluble polymers and water soluble dispersing agents to increase the colloidal clay viscosity, and plasticity such as disclosed in this assignee's prior U.S. Pat. No. 3,949,560, which Patent is hereby incorporated by reference, in amounts of about 0–10% by weight. In every case, the final mixture must meet ASTM standards for masonry cements, as previously defined. It should be noted for the purpose of this description of the present invention that the percentages described are for the masonry cement which does not include sand or water. The percentages are substantially changed when sand and water are added to make a mortar, but the additions of sand and water are made in accordance with ASTM specifications in standard amounts as with present prior art masonry cements and, therefore, applicants attach no criticality to the water and sand additions needed to form a mortar. Accordingly, percentages are described for the masonry cement only.

In accordance with an important feature of the present invention, no wet grinding is necessary to manufacture the masonry cement of the present invention. All components of the masonry cement of the present invention are added to a blender and dry blended together thereby eliminating the time consuming and necessary wet grinding associated with the addition of limestone to prior art masonry cements.

Four masonry cement compositions were prepared in accordance with the present invention having varying percentages of portland cement, diatomaceous earth, and bentonite, each composition being mixed with 3 cubic feet of silica sand and water and data were collected for flow, air content, water retention value and compressive strength in accordance with ASTM test procedures C-91. The following results were obtained as shown in examples 1-4:

EXAMPLE NO. 1

Mix Proportions: 47 lbs. (94% by weight) Type I Portland Cement; 0.16 lbs. (0.33% by weight) diatomaceous earth; 2.84 lbs (5.67% by weight) bentonite.

| Flow: | 108 |
| --- | --- |
| Air Content: | 16.9% |
| Water Retention Value: | 83 |

| Compressive Strength: | |
| --- | --- |
| 7 Days | 28 Days |
| 1230 PSI | 1605 PSI |
| 1275 PSI | 1565 PSI |
| 1245 PSI | 1580 PSI |
| Avg.: 1250 PSI | 1583 PSI |

EXAMPLE NO. 2

Mix Proportions: 46.5 lbs. (93% by weight) Type I Portland Cement; 0.2 lbs (0.4% by weight) diatomaceous earth; 3.3 lbs (6.6% by weight) bentonite.

| Flow: | 110 |
| --- | --- |
| Air Content: | 17.8% |
| Water Retention Value: | 85 |

| Compressive Strength: | |
| --- | --- |
| 7 Days | 28 Days |
| 1115 PSI | 1510 PSI |
| 1155 PSI | 1445 PSI |
| 1170 PSI | 1455 PSI |
| Avg.: 1147 PSI | 1470 PSI |

EXAMPLE NO. 3

Mix Proportions: 46 lbs. (92% by weight) Type I Portland Cement; 0.22 lbs. (0.44% by weight) diatomaceous earth; 3.78 lbs (7.56% by weight) bentonite.

| Flow: | 106 |
| --- | --- |
| Air Content: | 18.1% |
| Water Retention Value: | 79 |

| Compressive Strength: | |
| --- | --- |
| 7 Days | 28 Days |
| 1065 PSI | 1415 PSI |
| 1090 PSI | 1415 PSI |
| 1035 PSI | 1450 PSI |
| Avg.: 1063 PSI | 1427 PSI |

EXAMPLE NO. 4

Mix Proportions: 45.5 lbs. (91% by weight) Type I Portland Cement; 0.25 lbs. (0.5% by weight) diatomaceous earth; 4.25 lbs (8.5% by weight) bentonite.

| Flow: | 109 |
| --- | --- |
| Air Content: | 18.9% |
| Water Retention Value: | 78 |

| Compressive Strength: | |
| --- | --- |
| 7 Days | 28 Days |
| 980 PSI | 1390 PSI |
| 935 PSI | 1345 PSI |
| 915 PSI | 1380 PSI |
| Avg.: 943 PSI | 1372 PSI |

In addition, a typical presently available masonry cement, as obtained from Texas Industries, Type N masonry cement was tested, again mixing the masonry cement with three cubic feet of silica sand and water, and the following data were collected as shown in Example 5:

EXAMPLE NO. 5 (Prior art)

Mix Proportions: Texas Industries Type N Masonry Cement: 35 lbs. (50.0% by weight) Type I Portland cement; 29.4 lbs (42% by weight) high grade crushed limestone; 1.4 lbs (2% by weight) polyglycol; 1.4 lbs (2% by weight) fatty acids; 1.4 lbs (2% by weight) air entraining agent; 1.4 lbs (2% by weight) sucrose solution.

| Flow: | 112 |
| --- | --- |
| Air Content: | 15.7% |
| Water Retention Value: | 86 |

| | Compressive Strength: | |
| --- | --- | --- |
| | 7 Days | Days |
| | 950 PSI | 1405 PSI |
| | 985 PSI | 1475 PSI |
| | 1005 PSI | 1390 PSI |
| Avg.: | 980 PSI | 1423 PSI |

It was found that the prior art masonry cement composition of Example 5 required re-tempering after each approximately 20 minutes when tested outdoors at an 80° F. temperature. The masonry cements of Examples 1–4, prepared in accordance with the present invention, were tested over a period of 1.5 hours under the same ambient conditions without requiring re-tempering. Further, the cements of Examples 1–4 poured better than the masonry cement of Example of 5, had a better texture and did not appear to be as sandy as the masonry cement of Example 5. In terms of texture, when the masonry cements of Examples 1–4 were "jointed out" with a mason's jointer, the masonry cements of Examples 1–4 gave a much better, slicker finish and a more clean line to the wall than did the masonry cement of Example 5.

Additionally, the masons who tested the masonry composition of Examples 1–4 found that the masonry cements mixed much better than the masonry cement of Example 5, were capable of accepting sand much easier than the masonry cement of Example 5 and were much easier to handle because of the 50 lb. bag weight as opposed to the 70 lb. bag weight of Example 5. The masons used in the test procedure were exceptionally surprised about the "board life" of the masonry cements of the present invention (Examples 1–4) and it was difficult for the masons to believe that the masonry cements of the present invention still had good flow without re-tempering after 1.5 hours.

Although the present invention has been described by reference to only a single embodiment thereof, it will be apparent that numerous other modifications and embodiments may be devised by those skilled in the art and it is intended by the appended claims to cover all modifications and embodiments which fall within the true spirit and scope of the present invention.

We claim:

1. A masonry cement composition comprising Portland cement, about 0.05% to about 0.8% by weight diatomaceous earth and about 5% to about 16% by weight colloidal clay.

2. The masonry cement of claim 1 wherein said Portland cement is in an amount of at least 75% by weight of the entire composition.

3. The masonry cement of claim 2 wherein said Portland cement is included in an amount of about 83.2% to about 95% by weight.

4. The masonry cement of claim 1 wherein said colloidal clay comprises bentonite.

5. The masonry cement of claim 4 wherein said diatomaceous earth has a surface area of at least 20 square meters per gram.

6. A masonry cement composition consisting essentially of 75–95% by weight Portland cement; 0.05–0.8% by weight diatomaceous earth and 5–16% by weight water swellable colloidal clay.

7. The masonry cement of claim 6 wherein said colloidal clay comprises bentonite.

8. A method of masonry construction comprising mixing sand and water into a dry masonry cement composition to form a mortar, and applying a layer of said mortar onto a surface of a first masonry building member and disposing a secondary masonry building member in contact with said mortar layer to sandwich said mortar layer between said first and second building members thereby to structurally secure said first and second building members together, said masonry cement composition comprising Portland cement, about 0.05% to about 0.8% by weight diatomaceous earth and about 5% to about 16% by weight water swellable colloidal clay.

9. A method as defined in claim 8 wherein said masonry cement includes Portland cement in an amount of at least 75% of said masonry cement.

10. A method as defined in claim 9 wherein said Portland cement comprises about 83.2% to about 95% by weight of said masonry cement.

11. A method as defined in claim 8 wherein said masonry cement composition consists essentially of 75%–95% by weight Portland cement; 0.05%–0.8% by weight diatomaceous earth and 5%–16% by weight colloidal clay, said percentages based upon the total weight of the masonry cement composition.

12. The method as defined in claim 8 wherein said colloidal clay comprises bentonite.

13. The method as defined in claim 12 wherein said diatomaceous earth has a surface area of at least 20 square meters per gram.

14. The method as defined in claim 13 wherein said diatomaceous earth has a surface area of at least 60 square meters per gram.

15. A method of manufacturing a masonry cement composition comprising dry blending a composition comprising Portland cement, 0.05% to 0.8% by weight diatomaceous earth and 5% to 16% water swellable colloidal clay.

16. The method as defined in claim 15 wherein said colloidal clay comprises bentonite and wherein said diatomaceous earth has a surface area of at least 20 square meters per gram.

17. The method as defined in claim 15 wherein said Portland cement is included in an amount of at least 75% of said masonry cement.

18. The method as defined in claim 17 wherein said Portland cement is included in an amount of about 83.2% to about 95% by weight of said masonry cement.

* * * * *